C. P. SMITH.
ANTISKID DEVICE FOR VEHICLE WHEELS.
APPLICATION FILED OCT. 28, 1915.
1,207,089.
Patented Dec. 5, 1916.
2 SHEETS—SHEET 1.
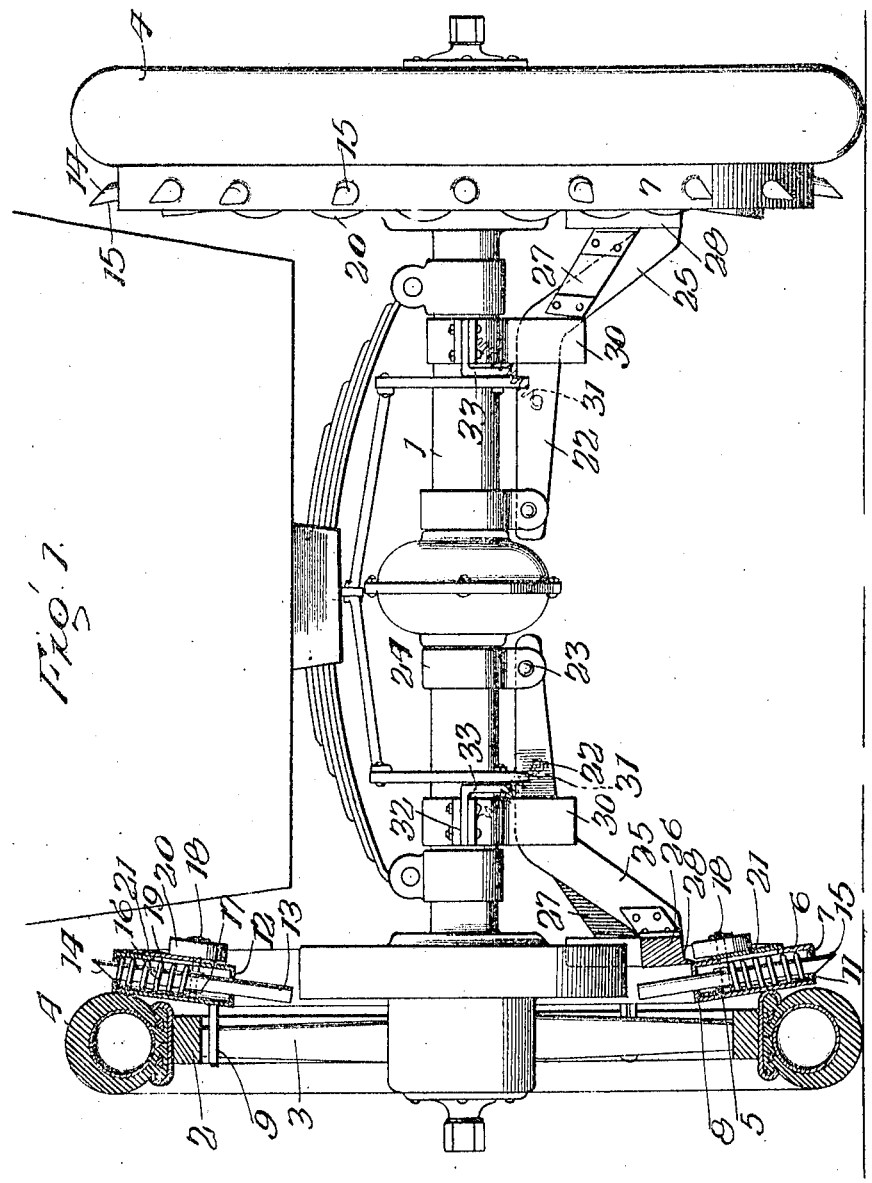
Inventor
C. P. Smith
By
Attorneys.

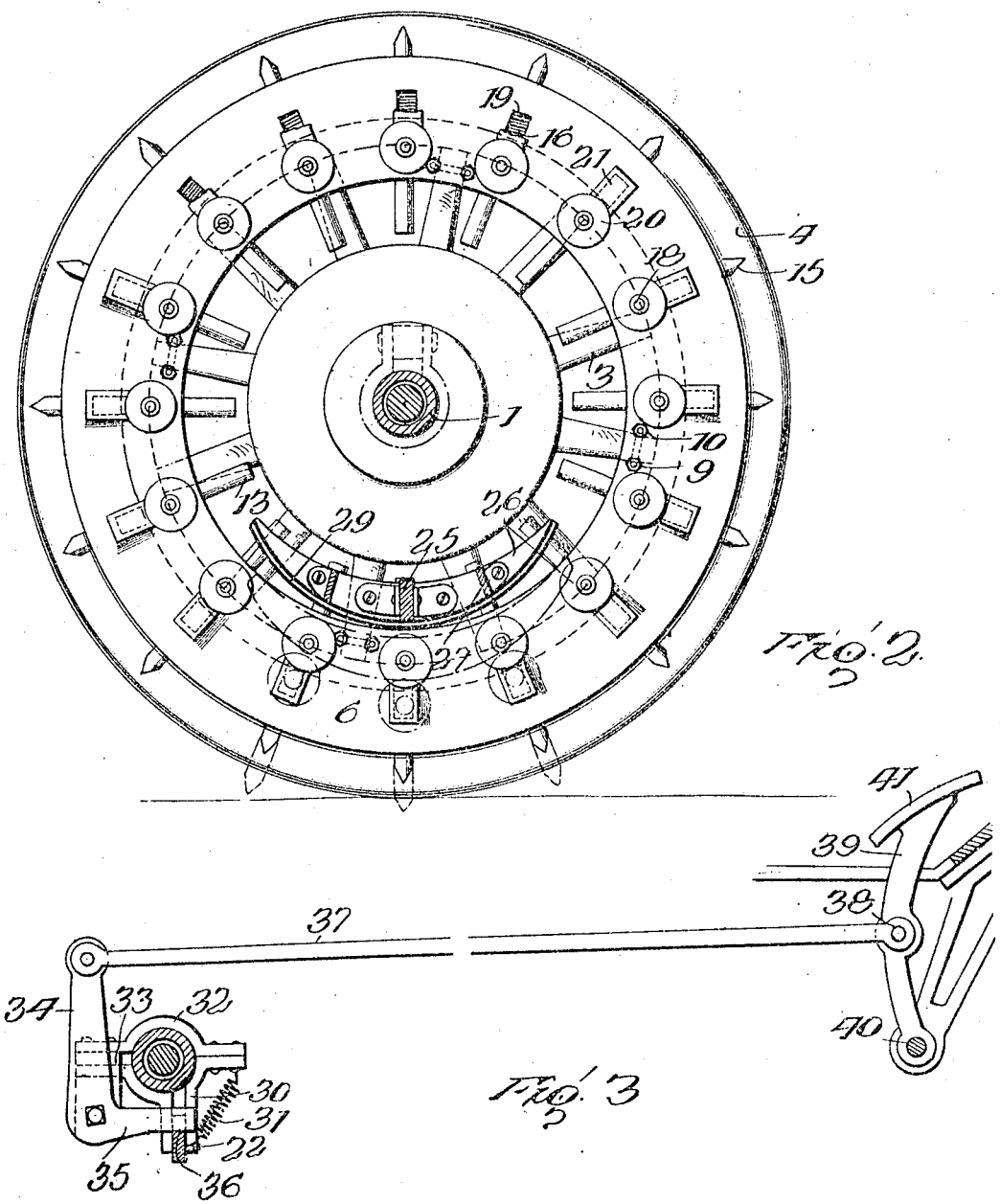

UNITED STATES PATENT OFFICE.

CHARLES P. SMITH, OF LOUISVILLE, KENTUCKY.

ANTISKID DEVICE FOR VEHICLE-WHEELS.

1,207,089.
Specification of Letters Patent.
Patented Dec. 5, 1916.

Application filed October 28, 1915. Serial No. 58,449.

*To all whom it may concern:*

Be it known that I, CHARLES P. SMITH, a citizen of the United States, residing at Louisville, in the county of Jefferson and State of Kentucky, have invented certain new and useful Improvements in Antiskid Devices for Vehicle-Wheels, of which the following is a specification.

This invention relates to anti-skidding devices for automobile and other vehicle wheels and more particularly to that type which are permanently carried by the wheel and which may be rendered active whenever desired, and the object of the invention is to provide a device of this class which will act positively and effectually to prevent skidding of the wheels to which it is applied, when rendered active, and which will not in any way impair the resiliency of the tires or other cushioning devices for the wheels.

Another aim of the invention is to provide novel means for projecting the anti-skidding spurs of the device into position for engagement with the road surface, which means may be readily actuated by the driver of the car by the exertion of foot pressure.

Another aim of the invention is to so construct and arrange the device that the anti-skidding spurs will engage the road surface at such an angle as to positively insure against skidding and to more securely engage and dig into the surface as the tendency to skid increases.

In the accompanying drawings: Figure 1 is a view partly in rear elevation and partly in vertical transverse section illustrating the anti-skid device embodying the present invention. Fig. 2 is a view partly in side elevation and partly in front to rear vertical section illustrating one of the anti-skid devices. Fig. 3 is a view partly in side elevation and partly in section, illustrating the actuating means for the device.

In the drawings, the numeral 1 indicates the casing for the rear axle of an automobile or other vehicle and 2 the rear wheels at the ends of the axle, the spokes of these wheels being indicated by the numeral 3 and the pneumatic tires by the numeral 4. Each of the anti-skid devices embodying the present invention includes an annular support or casing, the outer side of which is indicated by the numeral 5, the inner wall by the numeral 6, the outer peripheral wall by the numeral 7, and the inner peripheral wall by the numeral 8. By reference to Fig. 1 of the drawings it will be observed that the outer and inner side walls 5 and 6 respectively of the casing are inclined outwardly from the outer periphery of the casing so that when the casing is disposed against the inner side of the wheel the inner peripheral wall 8 thereof will be laterally outwardly displaced or offset with relation to the wall. Stated in other words, the outer peripheral wall 7 of the casing is cylindrical as also the inner peripheral wall and the inner side of the casing or, in other words, that side which is presented inwardly, is concave whereas the outwardly presented side is convex. The casing of each of the anti-skid devices is secured in place upon its respective wheel preferably by means of U-bolts 9 which are engaged with the spokes 3 and have nuts 10 threaded on to the ends of their arms and bearing against the concave inner side of the case or, in other words, against the wall 6. In order to accommodate and guide the anti-skid spurs of the device, the outer and inner walls 7 and 8 of the casing are formed respectively with openings 11 and 12. Each of the anti-skid spurs includes a shank 13 slidably fitted at its outer and inner ends in the openings 11 and 12 respectively and the outer end of each shank has its outer side beveled as indicated at 14 so as to provide an entering point or tooth 15. By reference to Fig. 1 of the drawings it will be observed that due to the peculiar formation of the casing the shanks 13, while radial to the axis of the wheel are so angularly positioned that their toothed ends 15 will be presented radially outwardly and also laterally inwardly. In other words, the anti-skid spurs are inclined with relation to the plane of the wheel to which the casing is secured. In order to normally hold the spurs retracted so that their toothed ends 15 will be out of position for engagement with the road surface and so that the resiliency of the tire 4 will not be impaired, a spring 16 is fitted to the shank of each spur within the casing and at its outer end bears against the outer peripheral wall 7 of the casing and at its inner end against a shoulder 17 upon the said shank. A stub spindle 18 projects laterally inwardly from the shank of each spur and through a slot 19 in the wall 6 of the casing. The spindles 18 slidably work within the slots 19 in the outward and inward movements of the spur shanks as will be readily understood and the outer end of each spindle supports a roller 20, the purpose of which will be presently explained. The inward movement of the anti-skid spurs is limited by the engagement of the spindle 18 with the inner end walls of the slots 19 although, if desired, this movement may be limited by providing any other suitable means for the purpose. In order to close the slots 19 so as to exclude dust and dirt from the casing, a cover plate 21 is carried by each spindle 18 and rests slidably against the outer face of the wall 6 of the casing, it being understood that these cover plates are movable with the spindles.

Referring to Fig. 1 and the full line showing of Fig. 2, it will be observed that normally the springs 16 yieldably hold the anti-skid spurs retracted and, therefore, means is provided whereby the spurs may be moved outwardly as they approach the road surface so as to engage the surface and prevent skidding.

The means referred to above includes a pair of lever arms, indicated by the numeral 22, each pivotally mounted at one end as at 23 in a suitable bracket 24 upon the axle casing 1, the arms being arranged in the manner shown in Fig. 1 of the drawings, and the said brackets being located substantially midway between the ends of the said casing 1. From their pivoted ends the lever arms 22 extend beneath the casing 1 and have their opposite end portions turned downwardly and outwardly at an angle as indicated at 25 and secured to a shoe indicated in general by the numeral 26, the connection of the arms with their respective shoes being braced by brace members 27 secured to the inner side of the shoe and to the portions 25 of the arms. The shoes 26 are of arcuate form and the outer or engaging side of each shoe is curved on the arc of a circle of less diameter than a circle touching the inner sides of the series of rollers 20, as clearly shown in Fig. 2 of the drawings, this surface being indicated specifically by the numeral 28 and being provided at the outwardly presented side of the shoe with a flange 29. The lever arms 22 near their outer portions 25 work in guides 30 fixed upon the axle casing 1 and springs 31 are connected at their lower ends to the said arms 22 and at their upper ends to the attaching portions of the brackets 30 and serve to yieldably support the said arms in position with the respective shoes 26 out of engagement with the rollers 20. It will now be understood that when the lever arms 22 are swung downwardly against the tension of the springs 31 the surface 28 of the shoe 26 will be brought into contact with the rollers 20 as the rollers pass beneath this face of each shoe and as the shoes are forced downwardly the rollers riding over the faces of the respective shoes will move in a corresponding direction, carrying with them the anti-skid spur shanks 13 in the manner clearly shown in Fig. 2 of the drawings. By reference to this figure it will be observed that inasmuch as the engaging face 28 of each shoe 26 is curved on an arc of a circle of less diameter than a circle touching the inner sides of the series of rollers 20, the rollers will gradually ride on to the said engaging face of the shoe and be gradually and yet positively moved radially outwardly as they approach the central portion of the face. The flange 29, as will be readily understood, serves to prevent relative displacement of the rollers 20 and shoe 26 when the shoe is in active position. It will also be understood that due to the peculiar formation of the casing in which the anti-skid spurs are mounted and due to the inclination of these spurs and the peculiar formation of their engaging toothed ends, should the machine tend to skid to the right, the spurs of the device carried by the left hand wheel will dig at an angle into the road surface and will more positively engage the surface as the tendency to skid increases. In a like manner, should the machine have a tendency to skid toward the left, the anti-skid spurs of the device upon the right hand wheel will act. Furthermore, due to the inclination of the spurs tendency toward overturning of the machine is arrested.

In order that the lever arms 22 may be swung downwardly to bring the shoes 26 into active engagement with the rollers 20 of the anti-skid devices, a foot lever mechanism is provided and will now be described. Secured to the axle casing 1 by means of clamp collars 32 are brackets 33 upon which are pivotally mounted angle levers 34, one arm of each of which extends upwardly and the other arm of which, indicated by the numeral 35, extends forwardly and engages a notch 36 formed in the respective lever arm 22. Rods 37 are pivoted to the ends of the upstanding arms of the angle levers and extend forwardly and are pivotally connected as at 38 to a foot lever 39 pivotally mounted as at 40 beneath the floor of the machine, the foot piece of the lever, indicated at 41, being located above the floor and in convenient position for engagement by the driver's foot. It will now be apparent by reference to Fig. 3 of the drawings, that when the foot lever 39 is swung forwardly the connecting rods 37 will be correspondingly moved and the angle levers 44 will be rocked so as to swing their arms 35 downwardly. This will result in simultaneous downwardly swinging movement of the lever arms 22 and in the projection of the anti-skid spurs in the manner above explained.

Having thus described the invention, what is claimed as new is:

1. In an anti-skid device of the class described, a casing designed to be secured to a vehicle wheel and having a concave inwardly presented side provided with radial slots, anti-skid members mounted for radial movement through the inner and outer peripheral walls of the casing, means yieldably holding the members retracted, a spindle projecting from each of the members and working in the respective slots, a roller carried by each spindle, a shoe movable into and out of coöperative relation to the said rollers, the said shoe having an arcuate engaging face describing the arc of a circle of less diameter than the circle described by the series of rollers, the said face of the shoe being provided with a flange for preventing relative displacement of the rollers and the shoe, and means for moving the shoe into and out of coöperative relation to the said rollers.

2. In an anti-skid device of the class described, a casing designed to be secured to a vehicle wheel and having a concave inwardly presented side provided with radial slots, anti-skid members mounted for radial movement through the inner and outer peripheral walls of the casing, means yieldably holding the members retracted, a spindle projecting from each of the members and working in the respective slots, a roller carried by each spindle, a shoe movable into and out of coöperative relation to the said rollers, the said shoe having an arcuate engaging face describing an arc of a circle of less diameter than the circle described by the series of rollers.

In testimony whereof I affix my signature.

CHARLES P. SMITH. [L. S.]